May 18, 1937.  E. R. JACOBY  2,080,662
ENGINE
Filed Oct. 28, 1935
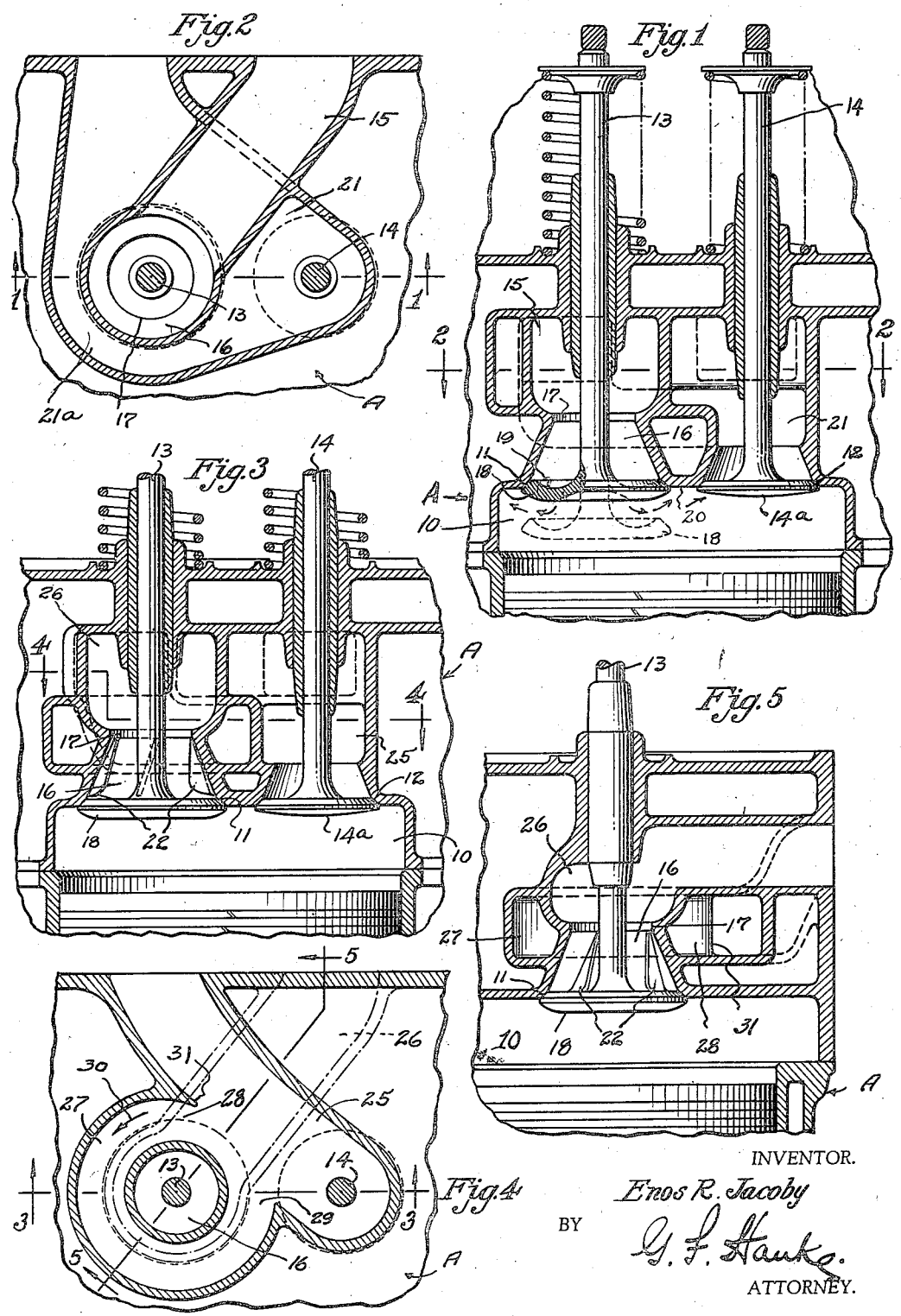
INVENTOR.
Enos R. Jacoby
BY
G. F. Hauks
ATTORNEY.

Patented May 18, 1937

2,080,662

UNITED STATES PATENT OFFICE 2,080,662

ENGINE

Enos R. Jacoby, Muskegon, Mich., assignor to Continental Motors Corporation, Detroit, Mich., a corporation of Virginia Application October 28, 1935, Serial No. 47,150

13 Claims. (Cl. 123—122)

This invention relates to engines and more particularly to the valve construction and other cooperating elements associated therewith for controlling the flow of gases into the engine combustion chamber.

One object of my present invention is to provide for more efficient preparation of the incoming gases which are introduced into the engine combustion chamber. More particularly, this construction provides means which enable the incoming gases to be more efficiently heated at a point immediately adjacent to the intake port of said combustion chamber.

A further object of the present invention is to provide means which tend to more completely and uniformly distribute the incoming gases in the engine combustion chamber by providing means in the intake passage for promoting a swirling tendency to the incoming gas.

Another object of the present invention is to provide a construction cooperating with the swirl promoting means whereby to cause the incoming gases to spread outwardly as the same are introduced in a swirling condition into the combustion chamber.

A further object of the present invention relates more particularly to the intake valve structure and the means carried thereby for directing the incoming gases toward the exhaust valve and toward the walls of the combustion chamber adjacent to the intake valve for the purpose of directing the incoming gases toward the hottest portions of the combustion chamber for eliminating the heavier particles of gas which are usually carried in said gas stream.

For a more detailed understanding of my invention reference may be had to the accompanying drawing which illustrates one form which my invention may assume, and in which:

Fig. 1 is a fragmentary vertical sectional view through an engine showing the intake and exhaust gas controlling means and taken substantially on the line 1—1 of Fig. 2, Fig. 2 is a horizontal plan sectional view of a fragmentary portion of an engine showing the relationship of the intake and exhaust gas passages, Fig. 3 is a vertical sectional view through a fragmentary portion of an engine of modified construction taken substantially on the line 3—3 of Fig. 4, Fig. 4 is a horizontal sectional view thereof taken substantially on the line 4—4 of Fig. 3, and showing the relationship of the intake and exhaust gas passages, and Fig. 5 is a vertical sectional view taken substantially on the line 5—5 of Fig. 4.

The engine illustrated in the accompanying drawing is designated in general by the reference character A in Figs. 1 and 2 illustrating one embodiment of the invention. The invention is preferably one which is generally referred to as a valve in head engine in which the intake and exhaust valves overlie the engine cylinder and open inwardly thereof into the combustion chamber carried in the cylinder head. In the structure illustrated in Figs. 1 and 2, the combustion chamber 10 is of conventional design and is provided with intake and exhaust ports 11 and 12 which lie substantially adjacent to each other. Intake and exhaust valves 13 and 14 are respectively associated with the intake and exhaust ports and are operated in the usual manner by suitable valve actuating mechanisms. The intake passage comprises one conducting portion 15 extending generally horizontally and a second portion 16 extending substantially normal to said first portion. It will be noted that the intake conducting portion 16 extends towards the intake port and lies immediately adjacent thereto and this portion of the intake passage is constructed to provide a venturi 17 and thus the incoming gases after passing through the venturi tend to spread outwardly as they near the intake port of the combustion chamber.

The intake valve 13 is provided with a mushroom type head 18 which is undercut as at 19 and it will be noted that the incoming gases which flow generally axially of portion 16 and of the valve shank are caused to impinge substantially against the dished out undercut portion 19 of the valve head 18 and thus be deflected in a direction which causes the incoming gases to impinge substantially along the roof 20 of the combustion chamber 10 and also against the head 14a of the exhaust valve 14. It will thus be noted that the incoming gases are caused to spread outwardly as they pass through the intake port and are directed against the hot surfaces of the combustion chamber whereby to more thoroughly vaporize the heavier particles of the fuel mixture.

It will be noted that the exhaust passage 21 extends from the exhaust port in a direction which crosses the intake passage and referring to Fig. 2 it will be noted that the exhaust passage tends to cross the intake conducting portion 15. This exhaust passage is divided to provide a portion 21a which sweeps around the intake conducting portion 16 and thus it may be noted that the exhaust gas passage is provided with a branched portion substantially encircling a portion of the intake passage. Thus the gases flowing through the said intake passage are more efficiently heated by the exhaust gases in a manner tending to improve engine operating performance.

Referring to Figs. 3 to 5 inclusive, it will be noted that I have provided a modified form of construction embodying said improvements which may be employed in engines of this character if so desired. In Fig. 3 it will be noted that I have provided the intake conducting portion 16 with a plurality of vanes 22 which are substantially inclined to the axis of the passage and which are operable to act upon the gases flowing therethrough and impart a swirling motion to said gases sufficient to continue the swirling tendency thereof as the same are introduced into the combustion chamber. Preferably these vanes cooperate with the venturi to provide a gas flow control which causes the incoming gases to spread outwardly as well as to swirl as the same are introduced into the combustion chamber.

In this modified construction it will be noted that I have provided an exhaust passage 25 which crosses the intake conducting portion 26 in substantially the same manner as the construction illustrated in Figs. 1 and 2. It will be noted that the branched portion of the exhaust gas passage is constructed differently than that shown in the previous figures and this branched portion of the exhaust gas passage is preferably constructed in the form of an annular chamber 27 extending substantially around the intake conducting portion 16. This annular chamber communicates with the exhaust gas passage by means of an inlet 28 and an outlet 29, the outlet facing generally in the direction of the gas flow through said passage 25 while the inlet 28 faces in a direction opposite to the exhaust gas flow through passage 25. Thus a portion of the exhaust gases flowing through the passage 25 tends to branch away from the main flow and travel through the annular chamber 27 in a direction as indicated by the arrow 30. The outlet 29 is so arranged with respect to the exhaust gas flow as to induce a flow through said chamber 27 due to the auto-extraction effect produced by the flow of gases through said passage 25. If desirable the exhaust gas conducting structure may be so constructed as to provide a split or dividing means 31 against which the exhaust gases are directed for the purpose of deflecting a predetermined amount of the exhaust gases into said chamber 27. Thus by relatively locating this split 31 more or less of the gases can be introduced into said chamber 27 for providing more or less degrees of heat for transfer to the intake gases.

Obviously the constructions herein illustrated and described are more particularly adapted for an engine of the valve in head type but it will be apparent that the principles involved may be incorporated in engines other than those herein illustrated.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an internal combustion engine having intake and exhaust gas passages, said exhaust gas passage extending adjacent to said intake passage and having an offset portion connected in parallel with said exhaust gas passage, said offset portion encircling a portion of the intake passage and conveying a portion only of said exhaust gases.

2. In an internal combustion engine having intake and exhaust gas passages, said exhaust gas passage extending adjacent to said intake passage and being divided to form two exhaust gas conducting portions, one of said gas conducting portions being constructed and arranged to extend around a portion of said intake passage and connected in parallel with said other gas conducting portion.

3. In an internal combustion engine having intake and exhaust gas passages, said exhaust gas passage extending adjacent to said intake passage, an offset annular exhaust chamber encircling a portion of said intake passage and having an opening communicating with said exhaust passage, said opening being constructed and arranged in conjunction with said exhaust passage to induce exhaust gas flow through said annular exhaust chamber by the auto-extraction effect induced by the exhaust gas flowing past said opening.

4. In an internal combustion engine having intake and exhaust gas passages, said exhaust gas passage extending adjacent to said intake passage, an annular exhaust chamber encircling a portion of said intake passage and having an inlet and outlet communicating with said exhaust passage, said inlet being located substantially beyond the outlet in the direction of all exhaust gas flow through said exhaust passage.

5. In an internal combustion engine having intake and exhaust gas passages, said exhaust gas passage extending adjacent to said intake passage, an annular exhaust chamber encircling a portion of said intake passage and having an inlet and outlet communicating with said exhaust passage, said inlet being located substantially beyond the outlet in the direction of all exhaust gas flow through said exhaust passage, said outlet facing substantially in the direction of gas flow in said passage while the inlet faces substantially opposed to the direction of gas flow in said passage.

6. In an internal combustion engine having intake and exhaust gas passages, said exhaust gas passage extending adjacent to said intake passage, an annular exhaust chamber encircling a portion of said intake passage and having an inlet and outlet communicating with said exhaust passage, said inlet being located substantially beyond the outlet in the direction of all exhaust gas flow through said exhaust passage, said outlet facing substantially in the direction of gas flow in said passage while the inlet faces substantially opposed to the direction of gas flow in said passage, said inlet substantially overlapping said exhaust gas passage and including deflecting means for dividing said exhaust gas flow and directing same to flow through said annular passage toward the outlet thereof.

7. In an internal combustion engine having intake and exhaust gas passages extending in substantially parallel planes, said exhaust passage crossing said intake passage.

8. In an internal combustion engine having intake and exhaust gas passages, said intake passage including successive portions extending substantially normal to each other, said exhaust passage crossing one of said intake passage portions and having a branched exhaust gas conducting portion substantially encircling said other intake passage portion.

9. In an internal combustion engine having intake and exhaust gas passages, said intake passage including a conducting portion extended in a plane parallel with and immediately above the plane of the exhaust gas passage and crossing same, said intake passage including another conducting portion extending substantially normal to said first conducting portion and to the plane of the exhaust gas passage, said exhaust gas passage having a branched exhaust gas conducting portion substantially encircling said last mentioned intake gas conducting portion and lying substantially in the plane of said exhaust gas passage.

10. In an internal combustion engine having an intake gas passage and an exhaust gas passage, said intake and exhaust gas passages each having portions extending in substantially parallel planes, the aforesaid exhaust gas passage portion extending substantially normal to the aforesaid intake gas passage portion.

11. In an internal combustion engine having intake and exhaust gas passages, said exhaust gas passage having a conducting portion extending adjacent to and lying in a plane extending substantially normal to a portion of said intake gas passage, and a second exhaust gas conducting portion communicating with said first exhaust gas conducting portion and constructed to encircle said portion of said intake gas passage.

12. In an internal combustion engine having intake and exhaust gas passages, said exhaust gas passage having a conducting portion extending adjacent to and lying in a plane extending substantially normal to a portion of said intake gas passage, and a second exhaust gas conducting portion, said second exhaust gas conducting portion having inlet and outlet openings and an intermediate conducting portion which are constructed and arranged to convey a portion only of said exhaust gases in heat conduction relation with that portion of the intake gas passage remote from said first exhaust gas passage.

13. In an internal combustion engine having intake and exhaust gas passages, said exhaust gas passage having a conducting portion extending adjacent to and lying in a plane extending substantially normal to a portion of said intake gas passage, and a second exhaust gas conducting portion communicating with said first exhaust gas conducting portion, and connected in parallel conducting relation with said first exhaust gas conducting passage and arranged to convey a portion only of said exhaust gases in heat conducting relation with said intake gas conducting portion.

ENOS R. JACOBY.